US010551629B2

(12) United States Patent
Wei

(10) Patent No.: US 10,551,629 B2
(45) Date of Patent: Feb. 4, 2020

(54) PARALLAX DEVICE AND THREE-DIMENSIONAL DISPLAY DEVICE

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/503,231

(22) PCT Filed: Sep. 9, 2016

(86) PCT No.: PCT/CN2016/098507
§ 371 (c)(1),
(2) Date: Feb. 10, 2017

(87) PCT Pub. No.: WO2017/113880
PCT Pub. Date: Jul. 6, 2017

(65) Prior Publication Data
US 2018/0314074 A1 Nov. 1, 2018

(30) Foreign Application Priority Data

Dec. 31, 2015 (CN) .......................... 2015 1 1028896

(51) Int. Cl.
G02B 27/22 (2018.01)
G09G 3/00 (2006.01)
(Continued)

(52) U.S. Cl.
CPC ......... G02B 27/2214 (2013.01); G02B 27/22 (2013.01); G09G 3/003 (2013.01);
(Continued)

(58) Field of Classification Search
CPC .... G02B 27/22; G02B 27/26; G02B 27/2214; G02B 27/2228; G02B 27/2264;
(Continued)

(56) References Cited

U.S. PATENT DOCUMENTS

2013/0201091 A1* 8/2013 Hung ..................... G02B 27/22
345/102
2014/0184960 A1* 7/2014 Yang .................. G02B 27/2214
349/15
(Continued)

FOREIGN PATENT DOCUMENTS

| CN | 101900887 A | 12/2010 |
| CN | 202171686 U | 3/2012 |

(Continued)

OTHER PUBLICATIONS

First Office Action for Chinese Application No. 201511028896.5, dated Aug. 1, 2017, 8 Pages.
(Continued)

Primary Examiner — Mustak Choudhury
(74) Attorney, Agent, or Firm — Brooks Kushman P.C.

(57) ABSTRACT

The present application relates to the field of 3D display technique, and provides a parallax device and a 3D display device. The parallax device includes a first grating unit and a second grating unit. The first grating unit includes first barriers and second barriers arranged alternately. The second grating unit includes third barriers that are in one-to-one correspondence with the first barriers. The third barriers are configured to prevent light transmitted through the first grating unit from entering and interfering with a viewing region.

20 Claims, 5 Drawing Sheets

(51) Int. Cl.
*H04N 13/31* (2018.01)
*G09G 3/36* (2006.01)
*G02F 1/1335* (2006.01)

(52) U.S. Cl.
CPC ............ *H04N 13/31* (2018.05); *G02F 1/1335* (2013.01); *G09G 3/36* (2013.01); *G09G 2300/023* (2013.01)

(58) Field of Classification Search
CPC ......... G02B 5/201; G02F 1/29; G02F 1/1347; G02F 1/1323; G02F 1/133512; G02F 1/1335; G09G 3/003; G09G 3/36; G09G 3/3426; G09G 2300/023; G09F 13/04; H04N 13/31; H04N 13/398

USPC ...... 359/462–465; 349/15; 348/43, E13.044, 348/E13.03; 362/97.1
See application file for complete search history.

(56) References Cited

U.S. PATENT DOCUMENTS

2015/0138455 A1    5/2015   Liao et al.
2016/0033778 A1    2/2016   Lin et al.

FOREIGN PATENT DOCUMENTS

| | | |
|---|---|---|
| CN | 102799024 A | 11/2012 |
| CN | 103499898 A | 1/2014 |
| CN | 104656321 A | 5/2015 |
| CN | 105629487 A | 6/2016 |
| EP | 2770365 A1 | 8/2014 |
| KR | 100828696 B1 | 5/2008 |
| WO | 2010136921 A2 | 12/2010 |

OTHER PUBLICATIONS

International Search Report and Written Opinion for Application No. PCT/CN2016/098507, dated Nov. 28, 2016, 12 Pages.
Second Office Action for Chinese Application No. 201511028896.5, dated Dec. 27, 2017, 7 Pages.

\* cited by examiner

| Sp | | | | | |
|---|---|---|---|---|---|
| R | R | R | R | R | R |
| G | G | G | G | G | G |
| B | B | B | B | B | B |
| R | R | R | R | R | R |
| G | G | G | G | G | G |
| B | B | B | B | B | B |
| R | R | R | R | R | R |
| G | G | G | G | G | G |
| B | B | B | B | B | B |
| R | R | R | R | R | R |
| G | G | G | G | G | G |
| B | B | B | B | B | B |

Fig. 7

PARALLAX DEVICE AND THREE-DIMENSIONAL DISPLAY DEVICE

CROSS-REFERENCE TO RELATED APPLICATIONS

This application is the U.S. national phase of PCT Application No. PCT/CN2016/098507 filed on Sep. 9, 2016, which claims priority to Chinese Patent Application No. 201511028896.5 filed on Dec. 31, 2015, the disclosures of which are incorporated in their entirety by reference herein.

TECHNICAL FIELD

The present disclosure relates to the field of three-dimensional (3D) display, in particular to a parallax device and a 3D display device.

BACKGROUND

Nowadays, users are in favor of liquid crystal displays (LCDs) due to their advantages such as low power consumption and being light and slim. The LCDs are widely used in various fields such telecommunication products and vehicle-mounted systems.

In related art, a 3D display device with a parallax device includes a display panel and a parallax device that is in contact with the display panel. A viewer's left and right eyes may view different images through the parallax device, so as to achieve a 3D view. However, for some electronic devices, a proper viewing distance has to be maintained. For example, a proper viewing distance between a liquid crystal television and the viewer is generally 3 meters. A viewer may not view a 3D image properly due to occurrence of interference when the viewing distance is too larger or too smaller than the proper viewing distance.

Audio-visual electrical devices are being developed in a direction of being lighter and slimmer. In the above solution for the parallax device, in order to maintain the viewing distance, a distance between the parallax device and the display panel has to be greater than a predetermined value, which may cause a thickness of the display device to be large, and thus cannot meet the need for a lighter and slimmer display device.

SUMMARY

An object of the present disclosure is to provide a parallax device and a 3D display device, so as to reduce a thickness of the 3D display device provided with the parallax device.

In one aspect, the present disclosure provides in some embodiments a parallax device for a display panel, including: a first grating unit; and a second grating unit arranged to be spaced apart from the first grating unit in a direction perpendicular to the display panel. The second grating unit is parallel with the first grating unit.

The first grating unit includes a plurality of first barriers and a plurality of second barriers, each of the first barriers is of a first width W11, each of the second barriers is of a second width W12, the first barriers and the second barriers are arranged alternately, and a first gap and a second gap are arranged among each of the first barriers and two of the second barriers adjacent to the first barrier.

The second grating unit includes a plurality of third barriers that are in one-to-one correspondence with the plurality of first barriers, each of the third barriers is of a third width W21, and the third barriers are configured to prevent light transmitted through the first gaps from entering a predetermined left-eye viewing region and enable at least a portion of the light transmitted through the first gaps to enter a predetermined right-eye viewing region, and prevent light transmitted through the second gaps from entering the predetermined right-eye viewing region and enable at least a portion of the light transmitted through the second gaps to enter the predetermined left-eye viewing region.

In another aspect, the present disclosure further provides in some embodiments a 3D display device including the above parallax device.

The technical effects of the above technical solutions may be as follows.

In the above solutions, the parallax device includes a first grating unit; and a second grating unit. The second grating unit may function to prevent the light transmitted through the first grating unit from entering and interfering with another viewing region, so that the first grating unit may be arranged to be more proximate to the display panel, thereby to obtain a lighter and slimmer display device.

BRIEF DESCRIPTION OF THE DRAWINGS

In order to illustrate the technical solutions of the present disclosure or the related art in a clearer manner, the drawings desired for the embodiments or the related art will be described briefly hereinafter. Obviously, the following drawings merely relate to some embodiments of the present disclosure, and based on these drawings, a person skilled in the art may obtain the other drawings without any creative effort.

FIG. 7 shows a width of a sub-pixel SP in another pixel structure of a display panel.

DETAILED DESCRIPTION

The present disclosure will be specifically described hereinafter in conjunction with the drawings and embodiments. The following embodiments are for illustrative purposes, but shall not be used to limit the scope of the present disclosure.

Figure 1A:
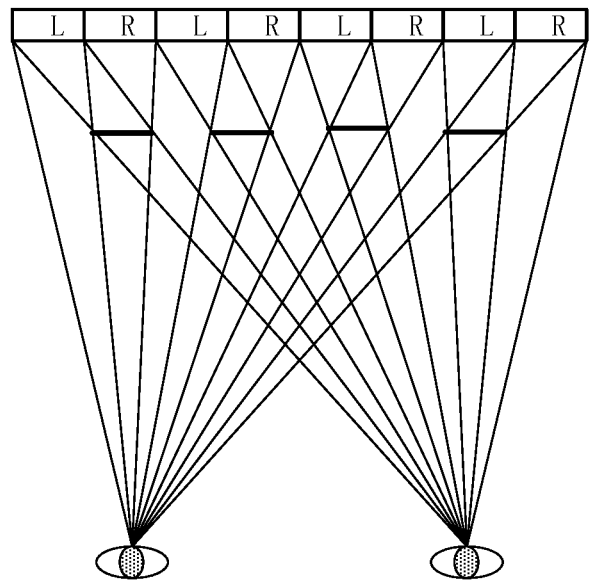
FIGS. 1a and 1b are schematic views showing an operating principle of a 3D display device with a parallax device in prior art.
Figure 1B:
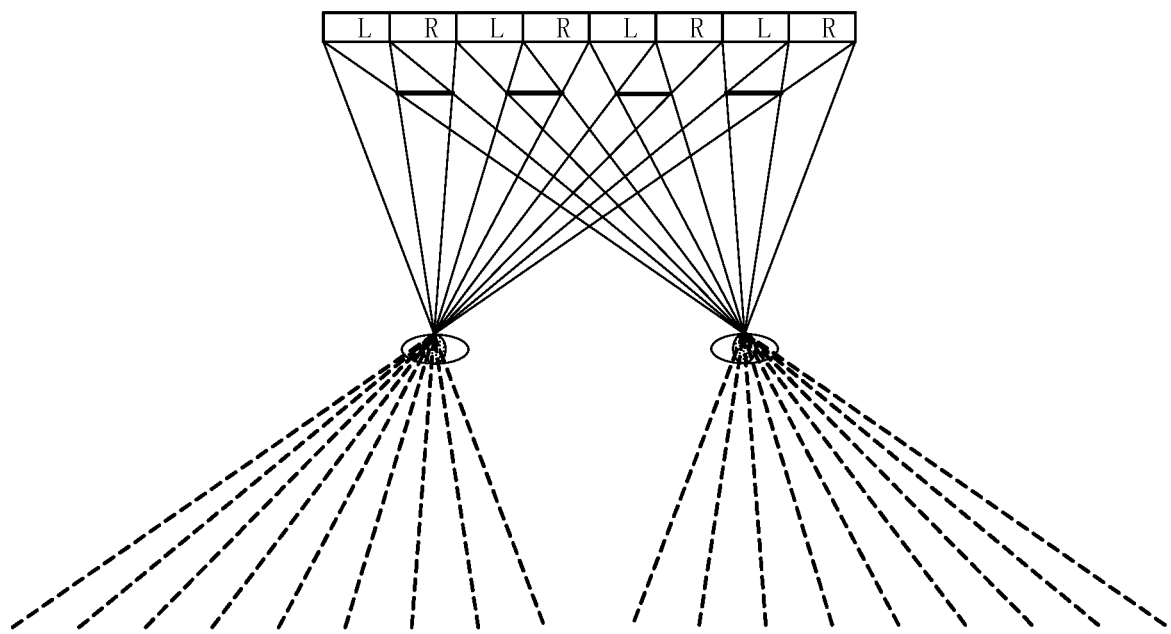

FIGS. 1a and 1b show an operating principle of a 3D display device with a parallax device in prior art. The 3D display device includes a display panel and a parallax device that is in contact with the display panel.

Pixels in odd columns of the display panel form a left-eye image for a viewer, and pixels in even columns of the display panel form a right-eye image for the viewer. The left-eye image is transmitted to a viewer's left eye in front of the display panel through light-transmissible gaps of the parallax device, and the right-eye image is transmitted to the viewer's right eye in front of the display panel through light-transmissible gaps of the parallax device. Thus, the viewer's left and right eyes may view different images through the parallax device, so as to achieve a 3D view.

Figure 2:
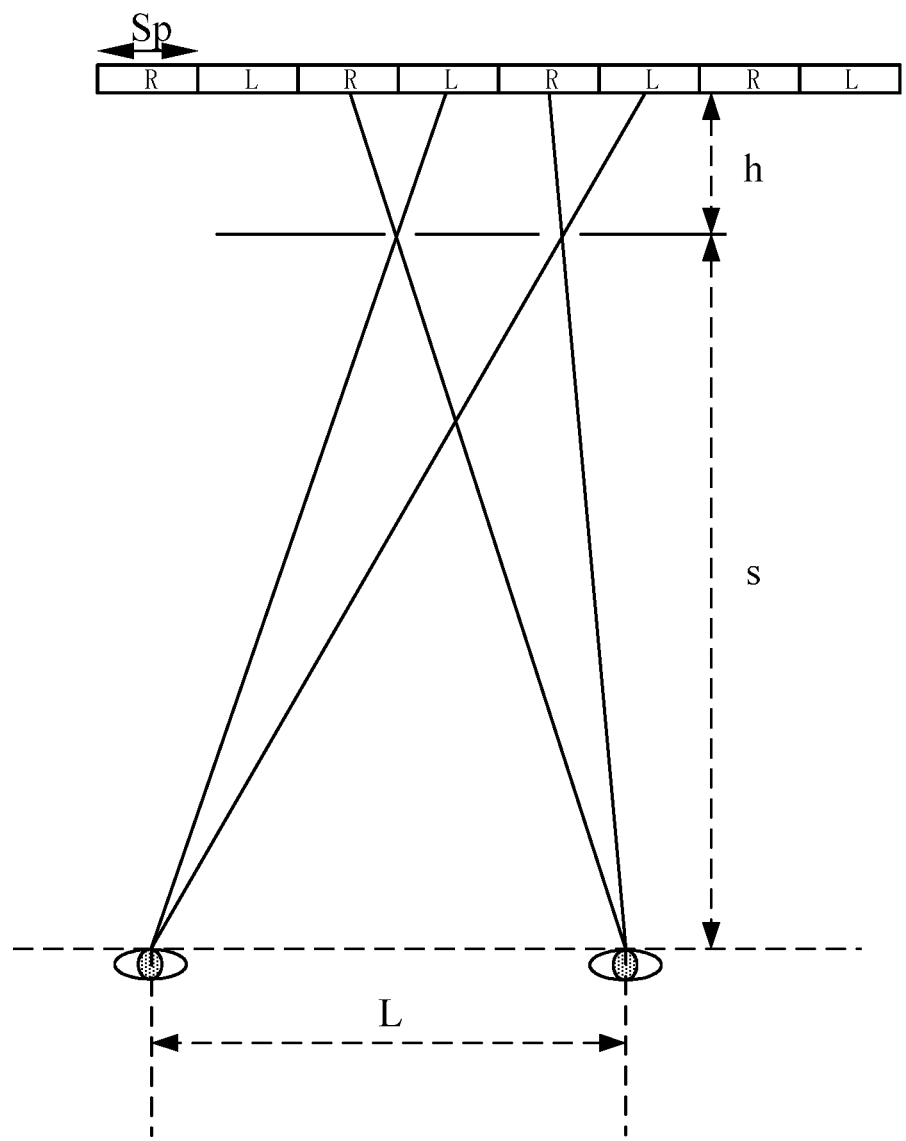
FIG. 2 is a schematic view showing the 3D display device with the parallax device where an interference occurs due to a large viewing distance between a viewer and the 3D display device in prior art.

In the 3D display device shown in FIG. 2 in prior art, Sp represents a width of a sub-pixel of the display panel, L represents a pupil distance of the viewer, h represents a distance between the parallax device and the display panel, and s represents a distance between the parallax and the viewer. Then, it can be obtained that: h=s*2Sp/L.

For a certain display module, the width Sp is predetermined, and the pupil distance L may be a constant, so that the distance h is in direct proportion to the distance s.

When the distance between the parallax device and the display device is reduced, e.g. when the large distance as shown in FIG. 1a is reduced to the small distance as shown in FIG. 1b, the viewing distance is reduced accordingly.

However, for some electronic devices, a proper viewing distance has to be maintained. For example, a proper viewing distance between a liquid crystal television and the viewer is generally 3 meters. The viewer may not view a 3D image properly due to occurrence of interference when the viewing distance is too larger or too smaller than the proper viewing distance, as shown in FIG. 1b.

Figure 3:
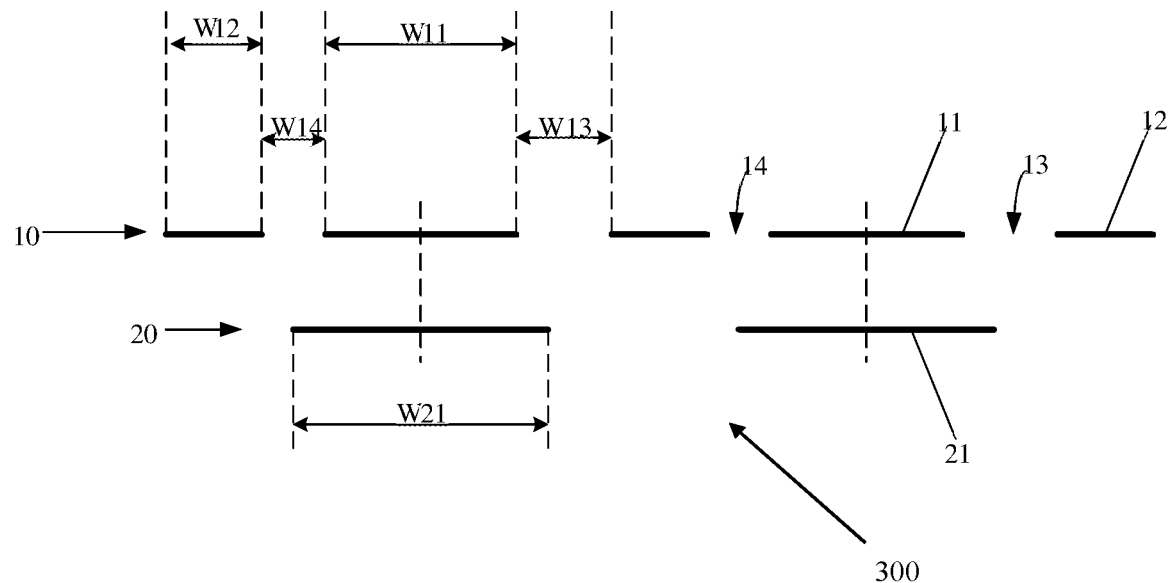
FIG. 3 is a schematic view showing a parallax device according to some embodiments of the present disclosure.

As shown in FIG. 3, the present disclosure provides in some embodiments a parallax device 300 for a 3D display device. The parallax device 300 includes a first grating unit 10 and a second grating unit 20 that are arranged to be parallel with each other. A second grating unit 20 is arranged to be spaced apart from the first grating unit 10 in a direction perpendicular to the display panel. The first grating unit 10 includes a plurality of first barriers 11 and a plurality of second barriers 12, each of the first barriers 11 is of a first width W11, each of the second barriers 12 is of a second width W12, the first barriers 11 and the second barriers 12 are arranged alternately, and a first gap 13 and a second gap 14 are arranged among each of the first barriers 11 and two of the second barriers 12 adjacent to the first barrier 11.

The second grating unit 20 includes a plurality of third barriers 21 that are in one-to-one correspondence with the plurality of first barriers 11, each of the third barriers is of a third width W21, and the third barriers 21 are configured to prevent light transmitted through the first gaps 13 from entering a predetermined left-eye viewing region and enable at least a portion of the light transmitted through the first gaps 13 to enter a predetermined right-eye viewing region, and prevent light transmitted through the second gaps 14 from entering the predetermined right-eye viewing region and enable at least a portion of the light transmitted through the second gaps 14 to enter the predetermined left-eye viewing region. In other words, the light transmitted through the first gaps 13 enters the right-eye viewing region, and the light transmitted through the second gaps 14 enters the right-eye viewing region.

In the above parallax device 300, the second grating unit 20 may function to prevent the light transmitted through the first grating unit 10 from entering and interfering with the right-eye viewing region or the left-eye viewing region, such that the first grating unit 10 may be arranged to be more proximate to the display panel, thereby to obtain a lighter and slimmer display device.

A projection of a central line of the first grating unit 10 on the display panel may coincide with a projection of a central line of one of the first barriers on the display panel in a row direction of the display panel, and a projection of a central line of the second grating unit 20 on the display panel coincides with a projection of a central line of one of the third barriers 21 on the display panel in a row direction of the display panel, so as to facilitate an alignment of the first grating unit 10 and the second grating unit 20 with the display panel. The display panel may be a flat display panel, and thus the first grating unit 10 and the second grating unit 20 are flat grating units accordingly. The display panel may be a curved display panel, and thus the first grating unit 10 and the second grating unit 20 are curved grating units accordingly.

In the embodiments, the first gaps 13 and the second gaps 14 are of an equal width. In other words, the first grating unit 10 is an optical device including a large amount of parallel gaps that are of an equal width and arranged at equal intervals, so as to secure a uniform brightness of the display. A typical process for manufacturing the first grating unit 10 and the second grating unit 20 may generally include: a first step of providing a transparent base, such as a glass substrate, a quartz substrate, or an organic resin substrate; a second step of forming an opaque film on the transparent substrate; and a third step of subjecting the opaque film with a patterning process to form an opaque-film-reserved region and an opaque-film-unreserved region, forming the barriers of the grating units in the opaque-film-reserved region, and forming light-transmissible gaps between adjacent barriers.

It should be noted that, a width of each of the first gaps of the first grating unit 10 may be different from that of each of the second gaps of the first grating unit 10. In the present disclosure, the second grating unit is provided to prevent the interference problem. In the case that the gaps of the first grating units 10 are not of an equal width, the first grating unit 10 may also be caused to be more proximate to the display panel.

Figure 6:
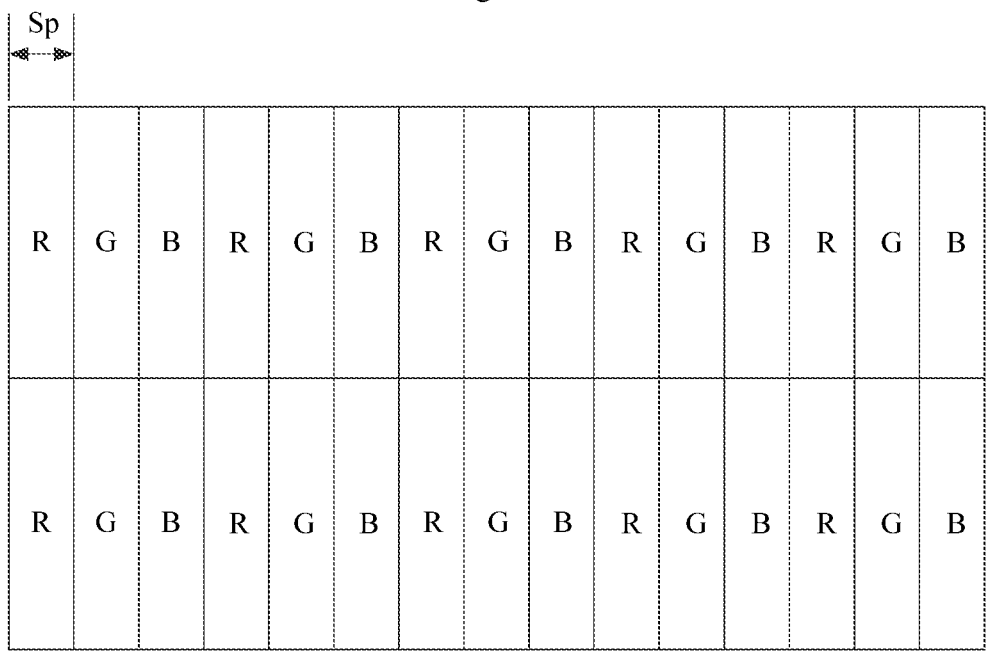
FIG. 6 shows a width of a sub-pixel SP in a pixel structure of a display panel.

As shown in FIGS. 6 and 7, sub-pixels of each pixel in the display panel may be arranged in a row direction or a column direction of the display panel, wherein the sub pixels may include, but not limited to, a red (R) sub-pixel, a green (G) sub-pixel and a blue (B) sub-pixel. For illustration purpose, it is assumed that a line connecting eyes of a viewer extends in the row direction. In each row of pixels, light of an image of odd-numbered sub-pixels enters a predetermined left-eye viewing region, and light of an image of even-numbered sub-pixels enters a predetermined right-eye viewing region. As shown in Figs. 1a and 1b, both the distance between the parallax device 300 and the viewer and the distance between the parallax device 300 and the display panel are related to the width Sp of the sub-pixel in the row direction.

In the embodiments of the present disclosure, in order to improve a display quality of the 3D display device, a width W13 of each first gap 13 and a width W14 of each second gap 14 are arranged each greater than 0 and smaller than 0.5*SP, where the SP represents a width of a sub-pixel on the display panel in a row direction of the display panel. The first gaps 13 and the second gaps 14 are arranged alternately in the row direction, so as to enable the light transmitted through the first gaps 13 and the light transmitted through the second gaps 14 to enter respective regions completely, and thus prevent the interference from occurring. The width W13 of the first gap 13 and the width W14 of the second gap 14 are equal in the row direction of the display panel.

In the parallax device 300, the third barriers 21 of the second grating unit 20 are in one-to-one correspondence with the first barriers 11 of the first grating unit 10, to prevent the light transmitted through the first gaps 13 and the light transmitted through the second gaps 14 from interfering with each other, such that the first grating unit 10 may be arranged to be more proximate to the display panel, thereby to obtain a lighter and slimmer display device. The light transmitted through the first gaps 13 and the light transmitted through the second gaps 14 enter the predetermined right-eye viewing region and the predetermined left-eye viewing region respectively, such that the light entering the right eye of the viewer and the light entering the left eye of the viewer may be of an equal intensity, and thereby improving the display quality of the 3D display device. Optionally, a center of a first orthogonal projection of each of the first barriers 11 on the display panel coincides with a center of a third orthogonal projection of a third barrier 21 corresponding to the first barrier 11 on the display panel, such that the light transmitted through the first gaps 13, blocked by the third barriers 21 and entering the right-eye viewing region, is of an intensity being consistent with that of the light transmitted through the second gaps 14, blocked by the third barriers 21 and entering the left-eye viewing region. In addition, it facilitates to align the first grating unit 10 with the second grating unit 20.

Figure 4:
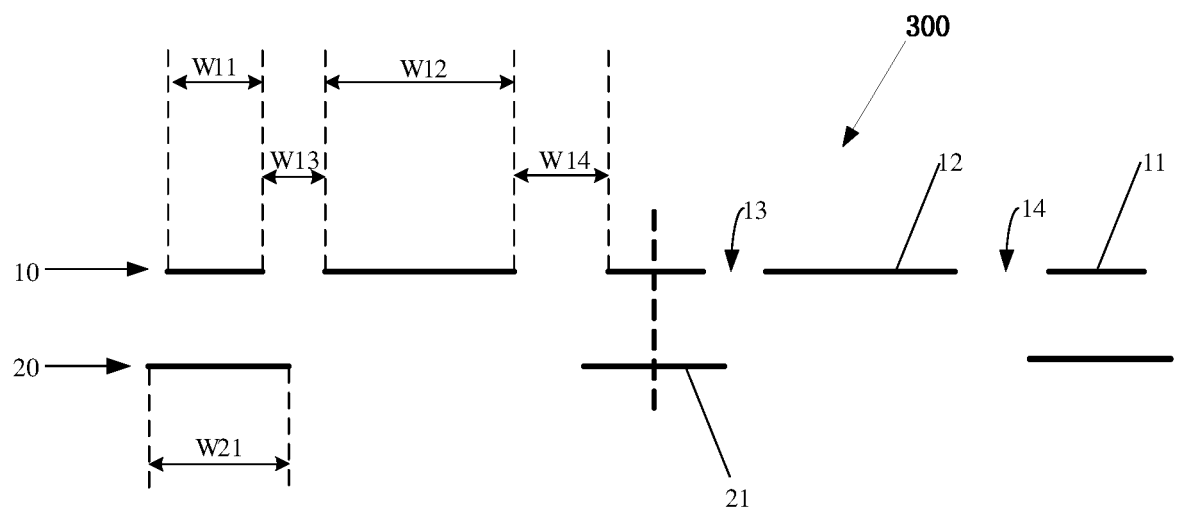
FIG. 4 is another schematic view showing a parallax device according to some embodiments of the present disclosure.

Further, it is arranged that the width W11 of the first barrier is greater than the width W12 of the second barrier, and the width W21 of the third barrier is greater than the width W11 and smaller than a sum of the first width W11, a width W13 of the first gap and a width W14 of the second gap, such that the third barriers 21 are arranged at equal intervals, as shown in FIG. 3. As a result, a second orthogonal projection of the second barrier 12 on the display panel is spaced apart from a third orthogonal projection of the third barrier 21 adjacent to the second barrier 12 on the display panel, such that the light transmitted through the first gaps 13 and the light transmitted through the second gaps 14 may not be blocked by the third barriers 21 in a complete manner, and portions of the lights may enter predetermined viewing regions. Alternatively, the width W11 of the first barrier may be arranged to be smaller than the width W12 of the second barrier, and the width W21 of the third barrier is greater than the width W11 and smaller than a sum of the first width W11, a width W13 of the first gap and a width W14 of the second gap, as shown in FIG. 4. As a result, a second orthogonal projection of the second barrier 12 on the display panel is spaced apart from a third orthogonal projection of the third barrier 21 adjacent to the second barrier 12 on the display panel, such that the light transmitted through the first gaps 13 and the light transmitted through the second gaps 14 may not be blocked by the third barriers 21 in a complete manner, and portions of the lights may enter predetermined viewing regions.

Figure 5:
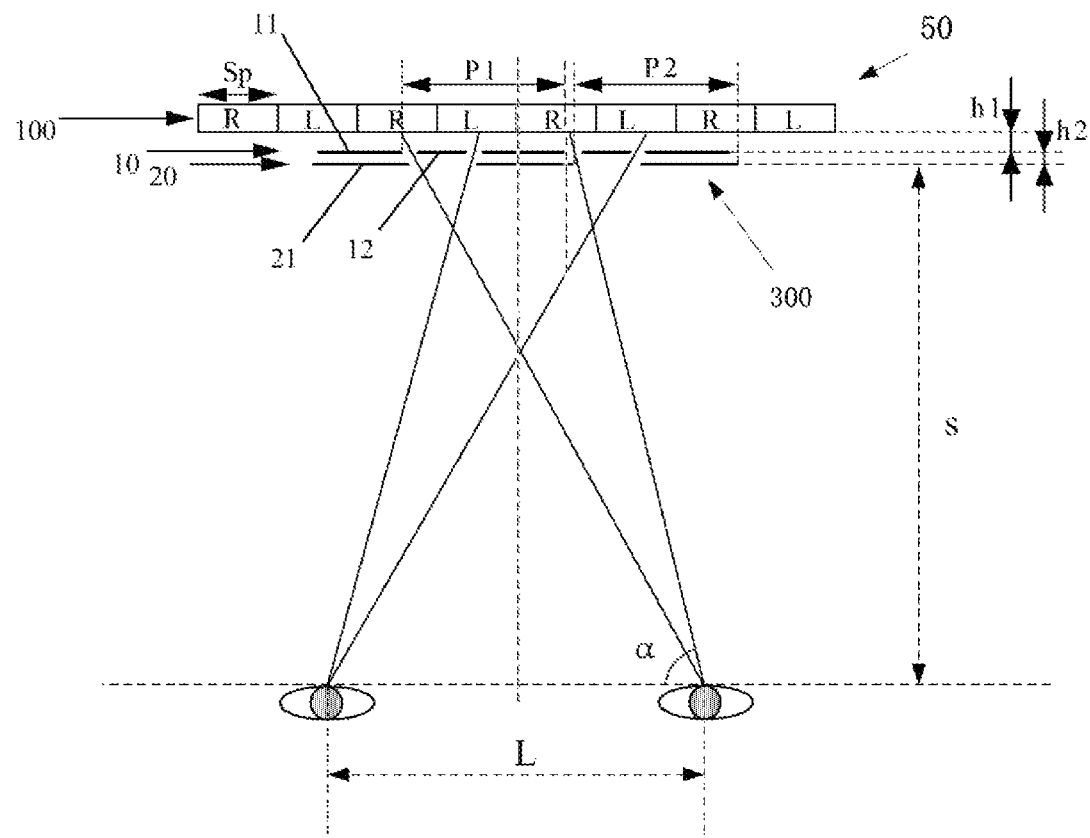
FIG. 5 is a schematic view showing an operating principle of a 3D display device with a parallax device according to some embodiments of the present disclosure.

An optimal viewing point may be generally right in front of the display panel of the 3D display device. Therefore, in the embodiments of the present disclosure, a projection of a central line of the first grating unit 10 on the display panel coincides with a projection of a central line of one of the first barriers 11 on the display panel in the row direction of the display panel, such that the viewing point is right in front of the first barrier 11, as shown in FIG. 5. To facilitate the alignment of the first grating unit 10 with the display panel, a projection of a central line of the first barrier 11 on the display panel coincides with a central line of the display panel in the row direction of the display panel, such that the viewing point is right in front of the display panel.

Further, a projection of a central line of the second grating unit 20 on the display panel coincides with a projection of a central line of one of the third barriers 21 on the display panel in the row direction of the display panel, such that the alignment of the first grating unit 10 with the second grating unit 20. In addition, the first barriers 11 and the third barriers 21 are arranged in a one-to-one correspondence manner, so as to prevent the light transmitted through the gaps at each of two sides of the first barriers 11 from entering another viewing region, and enable at least portions of the lights transmitted through the gaps to enter the predetermined viewing regions.

In actual implementation, it may be arranged that a projection of a central line of the first grating unit 10 on the display panel coincides with a projection of a central line of one of the first barriers 11 on the display panel in the row direction of the display panel, a projection of a central line of the second grating unit 20 on the display panel coincides with a projection of a central line of one of the third barriers 21 on the display panel in the row direction of the display panel, and a center of an first orthogonal projection of each of the first barriers 11 on the display panel coincides with a center of a third orthogonal projection of a third barrier 21 corresponding to the first barrier 11 on the display panel, so as to facilitate the alignments of the first grating unit 10, the second grating unit 20 and the display panel, and improve both an uniformity of the displayed image and the display quality of the 3D display device.

In the embodiments of the present disclosure, as shown in FIG. 3, the parallax device 300 includes a first grating unit 10; and a second grating unit 20 arranged to be spaced apart from the first grating unit 10 in a direction perpendicular to the display panel, and the second grating unit 20 is parallel with the first grating unit 10.

The first grating unit 10 includes a plurality of first barriers 11 and a plurality of second barriers 12, each of the first barriers 11 is of a first width W11, and each of the second barriers 12 is of a second width W12. The first barriers 11 and the second barriers 12 are arranged alternately, the first width W11 is greater than the second width W21, and a first gap 13 and a second gap 14 are arranged among each of the first barriers 11 and two of the second barriers 12 adjacent to the first barrier 11, each of the first gaps 13 and each of the second gaps 14 are of an equal width, and a projection of a central line of the first grating unit 10 on the display panel coincides with a projection of a central line of one of the first barriers 11 on the display panel in the row direction of the display panel.

The second grating unit 20 includes a plurality of third barriers 21 that are in one-to-one correspondence with the plurality of first barriers 11, each of the third barriers 21 is of a third width W21. A projection of a central line of the second grating unit 20 on the display panel coincides with a projection of a central line of one of the third barriers 21 on the display panel in the row direction of the display panel, and a center of a first orthogonal projection of each of the first barriers 11 on the display panel coincides with a center of a third orthogonal projection of a third barrier 21 corresponding to the first barrier 11 on the display panel. The third barriers 21 are configured to prevent light transmitted through the first gaps 13 from entering a predetermined left-eye viewing region and enable at least a portion of the light transmitted through the first gaps 13 to enter a predetermined right-eye viewing region, and prevent light transmitted through the second gaps 14 from entering the predetermined right-eye viewing region and enable at least a portion of the light transmitted through the second gaps 14 to enter the predetermined left-eye viewing region.

As shown in FIG. 5, the present disclosure provides in some embodiments a 3D display device 50 including the display panel 100 and the parallax device 300. The parallax device 330 is arranged at a side of the display panel 100 that displays the image, and the first grating unit 10 is arranged to be proximate to the display panel 100. The third barriers 21 are configured to prevent light transmitted through the first grating unit 10 from entering the predetermined left-eye viewing region or the predetermined right-eye viewing region, and enable at least a portion of the light transmitted through the first grating unit 10 to enter the predetermined right-eye viewing region or the predetermined left-eye viewing region. As a result, the first grating unit 10 may be arranged to be more proximate to the display panel, thereby to obtain a lighter and slimmer display device.

In particular, the third barriers 21 of the second grating unit 20 are configured to prevent the light transmitted by the even-numbered pixels R (the odd-numbered pixels L) of the display panel 100 through the first grating unit 10 from entering the predetermined left-eye viewing region (the predetermined right-eye viewing region), and enable at least a portion of the light transmitted by the even-numbered pixels R through the first grating unit 10 to enter the predetermined right-eye viewing region (the predetermined left-eye viewing region).

As shown in FIG. 5, in the 3D display device 50, the parallax device 300 is arranged at a side of the display panel 100 for displaying the image, the first grating unit 10 is arranged to be proximate to the display panel 100, and as follows, it is able to determine the widths of the barriers of the first grating unit 10 and the second grating unit 20 in the parallax device 300, a position relation between the first grating unit 10 and the second grating unit 20, and a position relation between the first grating unit 10 and the display panel 100, based on a light path diagram and an equation of similar triangles:

$$\frac{s+h2}{s+h1+h2} = \frac{P1}{nSp}$$

$$\tan(\alpha) = \frac{s+h1+h2}{(L-Sp)/2}$$

$$\frac{s}{s+h1+h2} = \frac{P2}{nSp}$$

$$W11 = Sp + 2h1/\tan(\alpha)$$

$$W12 = P1 - W11$$

$$W21 = Sp + 2(h1+h2)/\tan(\alpha)$$

where P1 represents a sum of the width W11 of each of the first barriers 11, the width W12 of each of the second barriers 12, the width W13 of the first gap 13 and the width W14 of the second gap 14 arranged among each of the first barriers 11 and two of the second barriers 12 adjacent to the first barrier 11 in the first grating unit 10; P2 represents a sum of the width W21 of each of the third barriers 21 and the width of the gap between two adjacent third barriers 21 in the second grating unit 20; s represents a distance between the second grating unit 20 and the viewer; h1 represents a distance between the first grating unit 10 and the display panel 100; h2 represents a distance between the first grating unit 10 and the second grating unit 20; Sp represents a width of each of the sub-pixels in the display panel 100; W11 represents a width of each of the first barriers 11 in the first grating unit 10; W12 represents a width of each of the second barriers 12 in the first grating unit 10; W21 represents a width of each of the third barriers 21 in the second grating unit 20; n represents a refractive index of a material filled between the first grating unit 10 and the second grating unit 20; and a represents an acute angle formed by a line of a first light beam and a connection line of the left eye and the right eye of the viewer, wherein the first light beam is transmitted by a sub-pixel (e.g. the sub-pixel R in FIG. 5) being most proximate to a central line between the left eye and the right eye of the viewer in the display panel and enters the right eye of the viewer. The material filled between the first grating unit 10 and the second grating unit 20 may be glass.

Alternatively, in the 3D liquid crystal display device according to the embodiments of the present disclosure, the parallax device may be arranged between the backlight module and the display panel, and the second grating unit of the parallax device may be arranged to be proximate to the display panel. Similarly, it is also able to determine the widths of the barriers of the first grating unit and the second grating unit in the parallax device, the position relation between the first grating unit and the second grating unit, and the position relation between the first grating unit and the display panel, based on the light path diagram and the equation of similar triangles, which will not be repeated herein.

In the embodiments of the present disclosure, the parallax device may be arranged to be more proximate to the display panel, so as to achieve the 3D display device with high pixels per inch (ppi) where the parallax device is required to be more proximate to the display panel.

The above are merely the optional embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A parallax device for a display panel, comprising:
a first grating unit; and
a second grating unit arranged to be spaced apart from the first grating unit in a direction perpendicular to the display panel, wherein the second grating unit is parallel with the first grating unit,
wherein the first grating unit comprises a plurality of first barriers and a plurality of second barriers, each of the first barriers is of a first width, each of the second barriers is of a second width, the first width is different than the second width, the first barriers and the second barriers are arranged alternately, and a first gap and a second gap are arranged among each of the first barriers and two of the second barriers adjacent to the first barrier; and
the second grating unit comprises a plurality of third barriers that are in one-to-one correspondence with the plurality of first barriers, each of the third barriers is of a third width, a third gap is formed between any two adjacent third barriers, and a projection of each of the second barriers on the plane of the second grating unit is located within a third gap, and the third barriers are configured to prevent light transmitted through the first gaps from entering a predetermined left-eye viewing region and enable at least a portion of the light transmitted through the first gaps to enter a predetermined right-eye viewing region, and prevent light transmitted through the second gaps from entering the predetermined right-eye viewing region and enable at least a portion of the light transmitted through the second gaps to enter the predetermined left-eye viewing region.

2. The parallax device according to claim 1, wherein the first width is greater than the second width, and the third width is greater than the first width and smaller than a sum of the first width, a width of the first gap and a width of the second gap.

3. The parallax device according to claim 1, wherein the first width is smaller than the second width, and the third width is greater than the first width, and smaller than a sum of the first width, a width of the first gap and a width of the second gap.

4. The parallax device according to claim 1, wherein an orthogonal projection of each of the second barriers on the display panel is space apart from an orthogonal projection of a third barrier adjacent to the second barrier on the display panel.

5. The parallax device according to claim 1, wherein a width of a gap between an orthogonal projection of each of the third barriers on the display panel and an orthogonal projection of a second barrier adjacent to the third barrier on the display panel, is equal to a width of another gap between the orthogonal projection of the third barrier on the display panel and an orthogonal projection of another second barrier adjacent to the third barrier on the display panel.

6. The parallax device according to claim 1, wherein a center of an orthogonal projection of each of the first barriers on the display panel coincides with a center of an orthogonal projection of a third barrier corresponding to the first barrier on the display panel.

7. The parallax device according to claim 1, wherein a projection of a central line of the first grating unit on the display panel coincides with a projection of a central line of one of the first barriers on the display panel in a row direction of the display panel.

8. The parallax device according to claim 1, wherein a projection of a central line of the second grating unit on the display panel coincides with a projection of a central line of one of the third barriers on the display panel in a row direction of the display panel.

9. The parallax device according to claim 1, wherein a width of the first gap and a width of the second gap are each greater than 0 and smaller than 0.5*SP, where the SP represents a width of a sub-pixel on the display panel in a row direction of the display panel.

10. A three-dimensional (3D) display device comprising the parallax device according to claim 1.

11. The 3D display device according to claim 10, further comprising a display panel, wherein the display panel comprises a plurality of pixels each comprising a plurality of sub-pixels that are arranged in a row direction or a column direction of the display panel, and the first barriers and the second barriers are arranged alternately in the row direction of the display panel.

12. The 3D display device according to claim 11, wherein a projection of a central line of one of the first barriers on the display panel coincides with a central line of the display panel in the row direction of the display panel.

13. The 3display device according to claim 10, wherein the first width is greater than the second width, and the third width is greater than the first width W11 and smaller than a sum of the first width, a width of the first gap and a width of the second gap.

14. The 3display device according to claim 10, wherein the first width is smaller than the second width, and the third width is greater than the first width, and smaller than a sum of the first width, a width of the first gap and a width of the second gap.

15. The 3D display device according to claim 10, wherein an orthogonal projection of each of the second barriers on the display panel is space apart from an orthogonal projection of a third barrier adjacent to the second barrier on the display panel.

16. The 3D display device according to claim 10, wherein a width of a gap between an orthogonal projection of each of the third barriers on the display panel and an orthogonal projection of a second barrier adjacent to the third barrier on the display panel, is equal to a width of another gap between the orthogonal projection of the third barrier on the display panel and an orthogonal projection of another second barrier adjacent to the third barrier on the display panel.

17. The 3D display device according to claim 10, wherein a center of an orthogonal projection of each of the first barriers on the display panel coincides with a center of an orthogonal projection of a third barrier corresponding to the first barrier on the display panel.

18. The 3D display device according to claim 10, wherein a projection of a central line of the first grating unit on the display panel coincides with a projection of a central line of one of the first barriers on the display panel in a row direction of the display panel.

19. The 3D display device according to claim 10, wherein a projection of a central line of the second grating unit on the display panel coincides with a projection of a central line of one of the third barriers on the display panel in a row direction of the display panel.

20. The 3D display device according to claim 10, wherein a width of the first gap and a width of the second gap are each greater than 0 and smaller than 0.5*SP, where the SP represents a width of a sub-pixel on the display panel in a row direction of the display panel.

* * * * *

UNITED STATES PATENT AND TRADEMARK OFFICE
CERTIFICATE OF CORRECTION

| | | |
|---|---|---|
| PATENT NO. | : 10,551,629 B2 | Page 1 of 1 |
| APPLICATION NO. | : 15/503231 | |
| DATED | : February 4, 2020 | |
| INVENTOR(S) | : Wei Wei | |

It is certified that error appears in the above-identified patent and that said Letters Patent is hereby corrected as shown below:

Column 10, Line 8, Claim 13:
After "first width"
Delete "W11".

and

Column 10, Line 5, Claim 13:
After "The"
Delete "3display" and
Insert -- 3D display --.

and

Column 10, Line 10, Claim 14:
After "The"
Delete "3display" and
Insert -- 3D display --.

Signed and Sealed this
Second Day of June, 2020

Andrei Iancu
*Director of the United States Patent and Trademark Office*